FIG. I
PRIOR ART

HARTZELL L. CROSBY
JOHN R. PARKINSON
*INVENTOR.*

3,396,076
METHOD OF RECOVERY OF CHEMICAL VALUES OF A KRAFT PULPING PROCESS OF CELLULOSIC MATERIAL

Hartzell L. Crosby, Federal Way, and John R. Parkinson, Bellevue, Wash., assignors to Parkinson, Crosby & Works, Inc., Seattle, Wash., a corporation of Washington
Filed Dec. 10, 1964, Ser. No. 417,274
3 Claims. (Cl. 162—33)

ABSTRACT OF THE DISCLOSURE

Method and apparatus for recovery of chemical values from the alkaline effluent resulting from the bleaching stage of a kraft pulping process, and for the recovery of relief and non-condensable gases. The alkaline effluent from the bleach plant is charged into the flue gas evaporator-scrubber as the scrubbing medium for the flue gases. It is then fed to the black liquor evaporators after which both the alkaline effluent and the black liquor are fired into the recovery furnace to recover primarily disodium chemical values. Use of the alkaline effluent as a flue gas scrubbing medium reduces odor omission from the recovery furnace stack. Relief gases and non-condensable gases evolved from the various stages of the pulping plant are directed to the furnace and fired therein below the black liquor firing zone. An auxiliary firing zone is established above the black liquor firing zone where volatilized sulphur containing components pass through direct flame with excess air so that they are oxidized.

---

Figure 1:
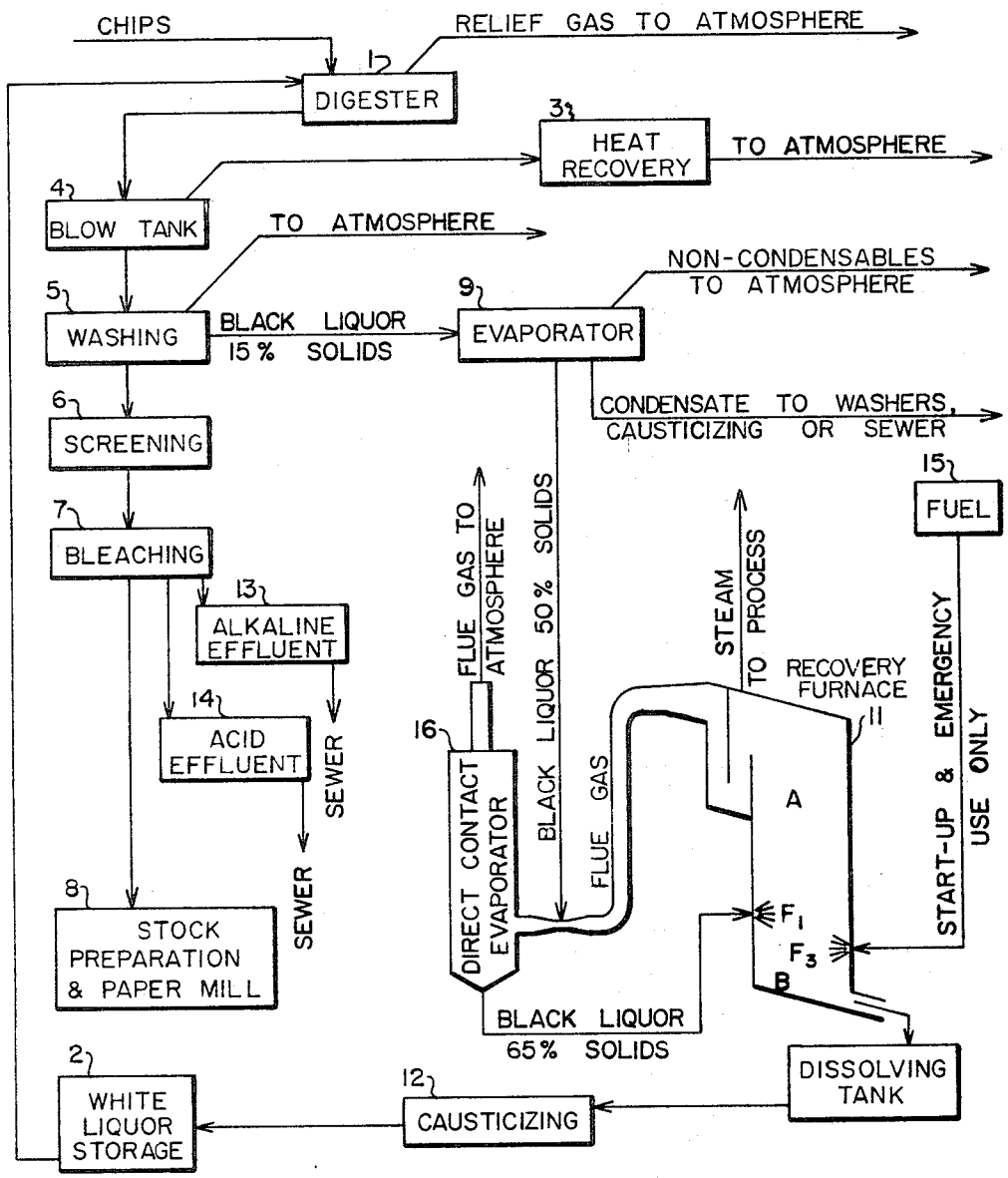

Present processes in use for the production of strong, high quality wood pulps for use in manufacture of paper, board or cellulose derivatives, generally involve removing the bark, reducing the log to chip form, and charging the chips into a pressure vessel or digester, where they are treated with solutions containing compounds of sodium and sulfur. The typical cooking liquors may be either acid, as with solutions of sodium bisulfite and free sulfur dioxide (the sulfite process), or alkaline as is the case where the treating liquors contain sodium hydroxide and sodium sulfide (the kraft process). During the digestion process, reactions occur between the sodium and sulphur compounds and certain of the wood substances bonding the fibers together, often said to be principally lignin, which renders them soluble in the treating liquor, thereby facilitating the reduction of the chip to its individual fibers or to "pulp." Although the gaseous relief products from the acid sulfite process are unpleasant, they are reasonably volatile and dissipate readily. Therefore, they are not nearly as objectionable as the reaction products from the alkaline sulfur containing liquors of the kraft process. In this case, the digestion operation results in the production of compounds such as hydrogen sulfide, methyl and ethyl mercaptan, dimethyl sulfide, dimethyl disulfide, and other complex organo-sulfides, all of which are malodorous and detectable to the human nose in the extremely dilute concentrations. These gases are generally heavier than air and stick close to the ground contaminating the surrounding countryside. In addition, they tend to be absorbed on the clothing, creating unpleasant working conditions.

Odors arising from the production of the sulfur bearing compounds in the alkaline kraft digestion process may be released to the atmosphere from a number of sources. For example, the digester relief gases which are vented during the heating of the digester in order to eliminate non-condensables are one source. A further source of odor is the digester blow gases which are emitted when the pressure is released at the completion of the digestion cycle. Further liberation of malodorous compounds occurs in the non-condensable gases evolved during the evaporation of the black liquor and in the condensates from the evaporation. A still further major area of offense is the actual recovery furnace combustion chamber itself, where the liquor is furnaced for the production of steam and recovery of chemicals and heat. In conventional practice, following the recovery furnace, liquor is treated in direct contact evaporators where a very great amount of malodorous material is transferred to the gas stream by a chemical reaction mechanism to be discussed later. Further odors are liberated in the vicinity of the brownstock washers and subsequently vented to the atmosphere.

In addition to the air-borne pollution outlined above, pulp and paper mills presently result in serious pollution of streams and waterways through the liquid effluents of the mill. Soluble portions of wood removed during the pulping and bleaching operations, combined with the residual treating chemicals enter the effluent streams in the form of carbohydrates, wood sugars and processing chemicals which have a chemical oxygen demand (C.O.D.) and/or a biological oxygen demand (B.O.D.). When discharged to natural waterways, these materials tend to remove oxygen from the water either by direct chemical reaction or indirectly. Inasmuch as oxygen is necessary for the support of marine life, the resulting effect can be harmful where a serious reduction in the concentration of oxygen occurs. Furthermore, the presence of wood sugars and similar compounds in the effluent streams tend to promote the growth of certain marine organisms which have the effect of not only depleting the oxygen further, as is the case with certain types of organic growth, e.g. *sphaerotillus*, but also of accumulating on the stream bed in undesirable plant life growth. Under certain conditions this will break loose from the stream bed and float in the water where it can be taken in by fish and similar marine life, clogging the gills and respiratory apparatus, and in many cases, resulting in their death. Citizens, sportsmen, and government public health agencies are properly aroused under such situations.

The principal sources of these liquid pollutants are the evaporator condensates, the excess water from the blow heat recovery system, any excess wash water on the brownstock washers or from accidental or intentional spills of chemicals, liquor or pulp from the system. A further principal and major cause of liquid effluent pollution is the waste water or effluent from each stage in the washing of pulp in a multi-stage bleaching sequence. "Bleaching" of chemical wood pulps is actually a misnomer in the sense that much more than the term straight "bleaching" is involved. In a succession of treatments with chlorine or chlorine-containing solutions and caustic soda, reactions occur with the lignin and low molecular weight hemicellulosic materials, dissolving them away from the more desirable fiber. The amount of the materials dissolved will depend upon the cooking conditions used in the pulping process and the degree of bleaching desired, but may vary from 5 to 10% of the weight of fiber entering the system. In the case of certain types of dissolving pulp, it may even run as high as 25%. The dissolved material ends up in the liquid effluent streams from the bleach plant and at the present time, is discharged to the mill sewer and subsequently, to the streams or some other receiving body of water. In some cases, it goes through an effluent treating plant where it is partially deactivated, but the intense color often remains. It was while considering ways to improve this situation that the present invention was made. Our principal objects are outlined below.

It is an object of this invention to reduce or virtually eliminate the airborne odors from the pulp mill. It is a further object of this invention to reduce the amount of liquid pollutants from a pulp mill. It is a further object of our invention to accomplish this reduction in pollution with the simultaneous recovery of valuable pulping chemicals such as sodium and organic matter with a useful fuel value. It is a still further object of our invention to reduce the total water requirements to the mill, therefore achieving not only a resulting decrease in the total volume of effluent from the mill, but also a reduced thermal loss into both the water and air streams. It is an even further object of our invention to reduce the possibilities of explosions in the recovery furnace which has caused serious damage and even loss of life in recent years. We have further discovered that these improvements can be achieved conjointly, thereby reducing capital requirements and making the reduction of effluents a more economically attractive course of action.

The process of our invention can best be understood by reference to FIGURE 1. FIGURE 1 represents a conventional pulping operation where chips from a chip pile are charged into digester 1 where they are treated with cooking liquor from the liquor recovery system 2. During the cooking operation relief gases are vented and turpentine is recovered by condensing volatiles from the gases. At the end of the cook a valve is opened and the contents blown into a blow tank 4 where steam flashes off releasing blow gases from the top, which then go to a blow heat recovery system 3. It is common practice to recycle the water contaminated with the blow gases through a heat exchanger to heat clean fresh water for process use. However, the nauseous odors are not condensed in the contaminated water due to the fact that it is saturated with these products and the odors are vented from the blow heat recovery system to the atmosphere.

Pulp from the base of the blow tank 4 is pumped to the brownstock washing system 5 where the dissolved solids are removed by counter-current washing with fresh water and the clean pulp goes on to screening 6 and then to the bleaching operation 7 or to a paper machine 8 if no bleach plant is installed. The recovered black liquor goes to a multiple-effect evaporator 9 where water and volatiles are driven off, resulting in a thick black liquor, contaminated condensate and non-condensable gases. The thick black liquor then goes to a direct contact evaporator or evaporator-scrubber 16 where it is treated with flue gases from the recovery furnace 11 to effect a further evaporation and to reduce the temperature of the flue gases. The black liquor leaves this evaporator concentrated to approximately 65% solids and is fired in the furnace 11.

Volatiles distill off in the upper part of the furnace in zone A and the dried liquor solids fall to the floor at B where they are smelted to an inorganic fused salt and reduced by the carbon in the liquor to a mixed salt of sodium carbonate and sodium sulfide with traces of sodium sulfate. This smelt runs out of the furnace into a smelt tank where it is dissolved to form a solution known as "green liquor." This green liquor returns to the recausticizing plant 12 where the sodium carbonate is converted to caustic soda by treatment with lime and the pulping liquor is, thereby, regenerated for reuse. It is common practice today to treat the black liquor with air in order to oxidize certain of the sulfur compounds to sodium sulfate and minimize their loss during the subsequent evaporation and burning operation.

In a bleaching plant the pulp is treated first with chlorine, retained in a tower for the necessary reaction time and subsequently washed. The washed pulp is then treated with a solution of caustic soda at an elevated temperature, whereupon it is again washed. It then may be treated with either chlorine dioxide or sodium hypochlorite and caustic soda followed by another washing step. This is followed by another caustic soda treatment and then another chlorine dioxide treatment, each being followed by a washing step. Much of the filtrate from the washing step is recycled within the particular stage. However, an excess equal to the amount of wash water applied to each stage must be spilled from the seal box below each washer. This is frequently passed in a counter-current manner back through the system until there are finally only two effluent streams leaving the bleach plant. One effluent stream leaves from the first caustic extraction stage and is known as the alkaline sewer 13. The alkaline effluent is very dark brown in color and contains a high percentage of B.O.D. material in the form of degraded wood sugars and solubilized, neutralized, chlorinated lignin. The other stream known as the acid sewer 14, consists predominately of chlorinated lignins. The acid stream will be at ambient temperature. However, the alkaline streams will be at an elevated temperature of 140°–170° F.

The important features of our invention will be illustrated by reference to FIGURE 2 which indicates the preferred method of practicing this invention in a modern kraft pulp and paper mill. It will be shown how the entire process can be integrated into an economically functional arrangement, whereby we dispose of all malodorous gas streams as well as the objectionable matter in the liquid effluent streams.

Of greatest significance is the fact that a sodium containing alkaline solution, preferably the alkaline effluent from the bleach plant, is recovered at the highest practical concentration and charged to the direct contact evaporator or evaporator-scrubber 16, where it is partially evaporated by the heat in the flue gas, then fed to the black liquor evaporators 9. It will be appreciated that sodium-bearing alkaline solutions other than bleach plant effluents may be employed. In this way, 60 percent of the pollution load normally discharged from the bleach plant is recovered and burned rather than being discharged to the streams. Furthermore, the sodium values recovered will pay for the extra evaporation involved. For reasons described fully below, this also greatly reduces odor emission from the recovery furnace stack.

Figure 2:
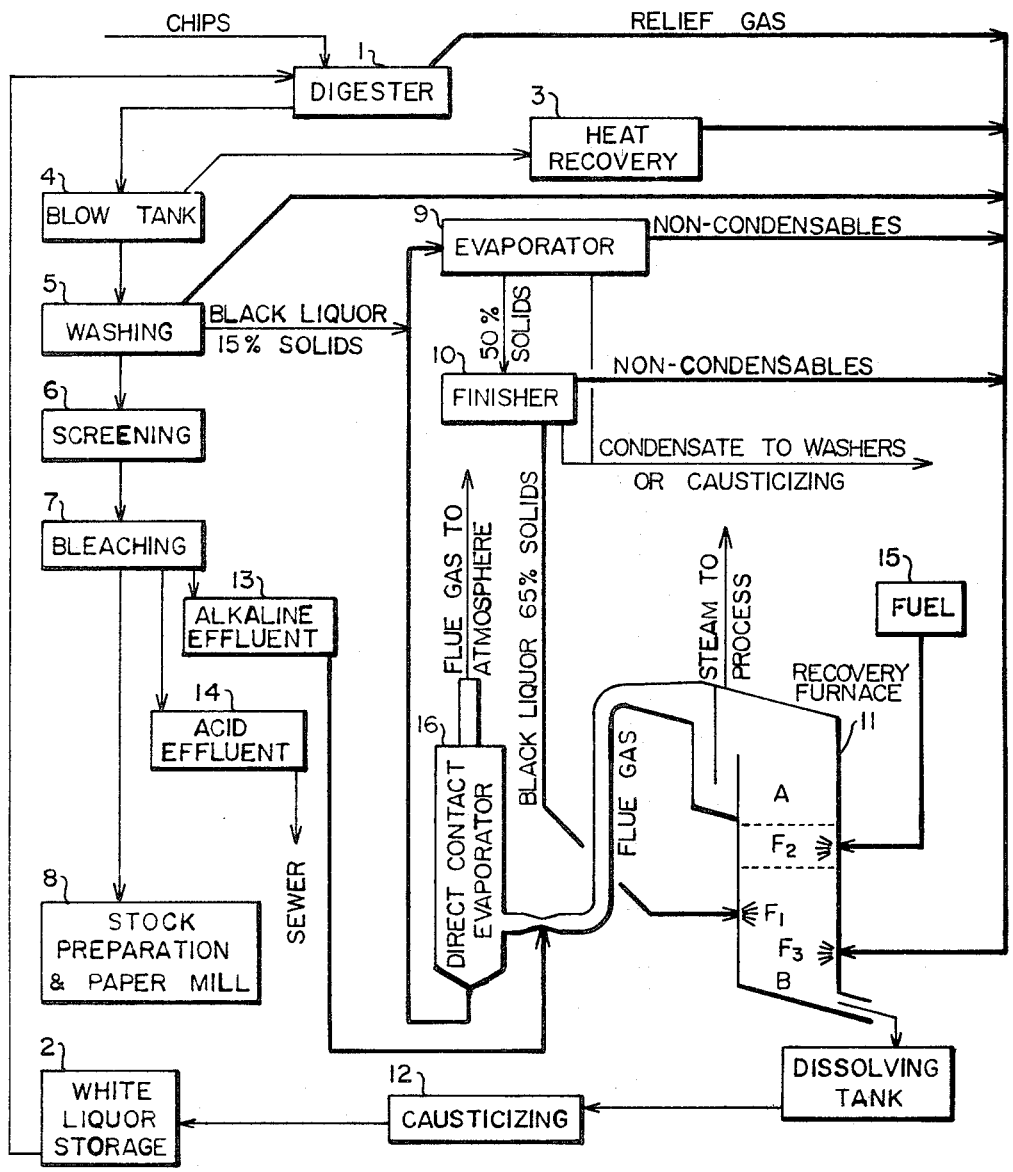

In FIGURE 2 we see that chips are treated in a pressure digester with solutions containing caustic soda and sodium sulfide. The digester relief gases are vented into the primary air streams to the recovery furnace. Relief gases from other sources mentioned above, as well as from the digester, also are vented to the recovery furnace. An alternate method of handling the gases would be to treat them in the primary air to the lime kiln or by oxidizing them with the chlorinator washer effluent from the acid sewer. However, in this case, the sulfur values would not be subsequently recovered. The non-condensable gases from the evaporation will be combined with the relief gases and handled in the same manner, that is, introduced into the recovery furnace at zone $F_3$.

In the recovery furnace proper, the distillation products from the black liquor being fired to the furnace as at $F_1$ are extremely malodorous as well as having an important value, as sulfur. In order to eliminate the odor and to recover the sulfur values, the furnace chamber is extended by a distance of approximately 5 to 20 feet above the liquor firing level, and an auxiliary firing zone $F_2$ introduced in the upper furnace zone. Conventional fuel, shown at 15, such as oil, natural gas, and the like, will be used in zone $F_2$. Thus, the hydrogen sulfide, mercaptan and organic sulfides volatized are caused to pass through a direct flame with excess air where they are completely oxidized to $SO_2$ or $SO_3$ according to the following equation:

$$2H_2S + 3O_2 = 2SO_2 + 2H_2O$$
$$CH_3SH + 3O_2 = SO_2 + CO_2$$
$$2(CH_3)_2S + 9O_2 = 2SO_2 + 4CO_2 + 6H_2O$$
$$2SO_2 + O_2 = 2SO_3$$

The effect of the proposed furnace arrangement is to cause the distillation products to pass from a lower temperature distillation zone $F_1$ in the furnace, where there is a great deal of heat absorption due to the evaporation of water from the liquor being fired, into a high temperature zone $F_2$ (approximating the flame temperature) before the gases are quenched by the boiler tubes. It is important to note that in the conventional furnace, the distillation products will only partially burn before they reach the cold tubes, in the stream generation zone, and if there is any shortage of oxygen, will very often be quenched so that no significant oxidation takes place. That this occurs is evidenced by the known facts that when a recovery furnace is overloaded to 125, 150% or more of its rated capacity, the emission of malodorous products goes up at an exponential order. In our system, with proper operation, complete combustion is assured. The heating value of the fuel fired in order to accomplish this reduction in odor is not lost, but contributes to the steam generation capacity of the furnace being entirely recovered in boiler passes. As most pulp mills only produce approximately half of their steam requirements in the recovery boiler, this means that the size of the auxiliary power boiler can be reduced by an amount equivalent to the amount of auxiliary fuel fired in the recovery boiler. This will amount to somewhere between 10 and 20% of the total generating capacity of the furnace. It is important that the furnace walls be extended as the amount of heat produced here must be removed to assure that the gases reach the boiler passes at no higher temperature than the fusion point of the ash suspended in the gas stream. Otherwise, the chemicals will smelt on the boiler tubes and if this is carried too far back into the boiler, serious slagging will occur. A further advantage of firing auxiliary fuel in the upper part of the furnace is a greatly reduced possibility of explosion with accompanying property damage and hazard to personnel. It is not known with certainty what causes recovery boiler explosions. It is possible that a leak in a tube might pour water into the molten smelt on the hearth and the resulting steam formation be of explosive force. A more likely explanation is that the leak reduces furnace temperature, causing loss of flame or a "blackout." Then an explosive gas forms as a result of distillation products from the liquor, or possible hydrogen produced by reaction of water with molten smelt or nascent sodium, or most probably, by the reaction of oxygen or steam with ignited carbon according to the producer gas or water gas reaction ($2C+O_2=2CO$ and $C+H_2O—CO+H_2$), to form carbon monoxide and hydrogen. This collects in the furnace in the presence of air being forced into the furnace by the fans. If generation of gas is at a rate such as to produce a combustible mixture which accumulates in the furnace, it can ignite explosively.

With reference to the firing zones in recovery furnace 11, it is to be understood that the arrangements of the firing zones may be altered from the preferred locations as shown. Firing of the vented or sulfur-bearing gases in zone $F_3$ will usually be with primary air below the liquor firing zone $F_1$. However, this relief gas firing may also be at the liquor firing level $F_1$ with secondary air. Relief gas firing in zone $F_3$ could also be introduced with tertiary air above the liquor firing zone $F_1$. In any event, liquor firing zone $F_1$ and relief gas firing zone $F_3$ at least will be below the auxiliary fuel firing zone $F_2$. Firing in the various zones with the materials described will be by conventional methods and equipment. It is nevertheless considered a unique and novel contribution to the art that the furnace structure is such as to be fired in three zones by the particular materials enumerated.

Use of an auxiliary fire of some magnitude will minimize "blackouts" and assure a constant source of ignition within the furnace to prevent the accumulation of explosive amounts of gas.

Another significant feature of this invention has to do with the direct-contact evaporator 16 following the recovery furnace. In a conventional furnacing operation, the alkaline evaporated black liquor containing the sulfides, mercaptans and other organic sulfur compounds is brought in direct contact with hot flue gases containing large quantities of carbon dioxide in a direct contact evaporator. It is not generally realized that carbon dioxide, being a stronger acid than hydrogen sulfide, or the organic sulfur acids, will replace these latter acids in the black liquor through a carbonation reaction according to the following equation:

$$Na_2S+CO_2+H_2O=Na_2CO_3+H_2S\uparrow$$
$$2CH_3S-Na+CO_2+H_2O=Na_2CO_3+2CH_3SH\uparrow$$
$$Org-S-CH_3+CO_2+H_2O=Org-CO_3+2CH_3SH\uparrow$$

This was recognized by Gray, Crosby, and Steinberg and forms the basis for United States Patent No. 2,772,965 for the precipitation of lignin compounds and recovery of sulfur. Release of the noxious organic sulfur compounds by the carbonation reaction at this point introduces them directly into the stack gases where they are vented to the atmosphere. This carbonation reaction is further facilitated by the fact that contact with the flue gas is normally made in a device especially designed to produce very intimate mixing of thin films of liquor with the flue gas in order to effectively recover the suspended inorganic ash as well as to evaporate water. The very factors which favor dust recovery will tend to promote the carbonation operation. Direct contact evaporators are frequently of the so-called "Cascade" type where a series of rods or discs assembled on a wheel are made to dip below the surface of the liquor and to carry liquor films up into the gas stream. An alternate procedure is to use a venturi scrubber where the black liquor is atomized into a high velocity gas stream and the liquid particles subsequently recovered in a wet cyclone and recycled along with make-up liquor. The venturi scrubber is an effective method both of evaporation and of eliminating and recovering the suspended chemicals from the gas stream, whereas the Cascade is an effective evaporator but is usually followed by an electrostatic precipitator where high tension electrical charges are used to attract the suspended dust and reclaim it from the gas stream.

Recognizing the undesirable effect of this carbonation operation but, also, the necessity of continuing to scrub the gases, we have discovered that gas scrubbing can be effectively carried out by means of a solution containing a sodium alkalinity, but which has no malodorous sulfur compounds in it to be distilled. Thus, instead of black liquor in the venturi scrubber, we can use the sodium carbonate or sodium hydroxide required as make-up chemical for the mill. Even more significant, it has been recognized that sodium is available in an effluent from the caustic extraction stages in the bleach plant of a bleached kraft pulp mill if proper provision is made to recover it as a sufficiently concentrated solution—that is, with a minimum of dilution—so that it can all be utilized within the plant. This is the effluent referred to above which is dark in color and which carries most of the pollution load from the bleach plant. By using this effluent in the evaporator-scrubber 16 it can be evaporated and the organic matter subsequently burned rather than being sent to the sewer. A further advantage in using these solutions is that the sodium content, representing between one and two dollars per ton of production, will also be recovered and returned to the system where it serves as make-up chemical in the liquor recovery cycle. In addition, the organic matter, although insufficient in itself to support combustion, will still be sufficient to partially offset the cost of the evaporation and furnacing operation. In other words, as opposed to conventional processes, the black liquor is not used in the direct contact evaporator-scrubber 16. Thus, provision must be made for carrying out an equivalent amount of evaporation to achieve the necessary solids for firing. This we do in an indirect contact evaporator or "finisher" 10, following the final effect of the multiple effect evaporators 9. A further advantage in this is that the non-condensable and condensable distillation products from the finisher 10 are recovered in the usual manner and further that a much better steam economy is obtained in the finisher than in the direct contact evaporator. In the latter case, it takes approximately a thousand B.t.u.'s to evaporate a pound of water, whereas in the evaporator-finisher 10, one thousand B.t.u.'s will evaporate 4 or 5 pounds of water, depending on the number of effects in the evaporator, so a further economy is realized.

This significant discovery alone, will greatly improve the undesirable pollution conditions associated with a kraft pulp mill, but the advantages are further extended through the use of the remainder of the processes of our invention as outlined above.

What is claimed is:

1. In a method for reducing dischargeable air and water pollutants from sulfate pulping plant having digestion, bleaching, evaporation, liquor recovery and recausticizing stages, said bleaching stage including caustic extraction, and which includes a recovery furnace where black liquor is combusted and a direct contact evaporator-scrubber for scrubbing flue gases evolved from the recovery furnace, the steps of:
    (a) passing sulfur-bearing relief and non-condensable gases from the digestion, washing and evaporation stages of said plant into said recovery furnace below the combustion zone fired by black liquor to oxidize said gases.
    (b) continuously firing conventional fuel above the combustion zone fired by black liquor, and
    (c) directing effluent from the caustic extraction in the bleaching stage into said direct contact evaporator for scrubbing flue gases from said recovery furnace.

2. In a method for reducing dischargeable air and water pollutants from a sulfate pulping plant having digestion, bleaching, direct and indirect contact liquor evaporation, liquor recovery and recausticizing stages, said bleaching stage including caustic extraction, and which includes a heat and chemical recovery furnace for combusting black liquor and a direct contact evaporator-scrubber for scrubbing flue gases evolved from the recovery furnace, the steps of:
    (a) passing sulfur-bearing relief and noncondensable gases from the digestion, washing and evaporation stages of said plant into said recovery furnace below the combustion zone fired by black liquor to oxidize said gases,
    (b) continuously firing conventional fuel above the combustion zone fired by black liquor,
    (c) directing effluent from the caustic extraction in the bleaching stage into said direct contact evaporator for scrubbing flue gases from said recovery furnace,
    (d) firing black liquor from the evaporation stage into the black liquor combustion zone in said recovery furnace, and
    (e) adding sodium-bearing discharge from said evaporator-scrubber into the liquor evaporation stage for recovery of sodium values therefrom.

3. In a method for reducing dischargeable air and water pollutions from a sulfate pulping plant having digestion, bleaching, direct and indirect contact liquor evaporation liquor recovery and recausticizing stages, said bleaching stage including caustic extraction, and which includes a heat and chemical recovery furnace for combusting black liquor and a direct contact evaporator-scrubber for scrubbing flue gases evolved from the revovery furnace, the steps of:
    (a) passing sulfur-bearing relief and non-condensable gases from the digestion, washing and evaporation stages of said plant into said recovery furnace below the combustion zone fired by black liquor to oxidize said gases,
    (b) continuously firing conventional fuel above the combustion zone fire by black liquor,
    (c) adding effluent from the caustic extraction in the bleaching stage into said direct contact evaporator for scrubbing recovery furnace flue gases, and
    (d) firing black liquor from the evaporation stage into the black liquor combustion zone in said recovery furnace.

References Cited

UNITED STATES PATENTS

| | | | |
|---|---|---|---|
| 1,809,427 | 6/1931 | Spohn | 162—51 |
| 1,906,886 | 5/1933 | Richter | 162—30 |
| 3,127,237 | 3/1964 | Markant | 23—48 |
| 3,163,495 | 12/1964 | Greenawalt | 23—277 |

FOREIGN PATENTS 818,572    8/1959    Great Britain.

OTHER REFERENCES

Dudley et al.: "A Study of the Odors Generated in the Manufacture of Kraft Paper," Paper Trade Journal, June 1939, pp. 30, 31, 32, 33.

S. LEON BASHORE, *Primary Examiner.*